(12) United States Patent  
Hariri (10) Patent No.: US 8,622,337 B2
(45) Date of Patent: Jan. 7, 2014

(54) AIRSHIP FOR TRANSPORTATION (75) Inventor: Mohammed Hariri, Riyadh (SA)

(73) Assignee: King Abdulaziz City for Science and Technology, Riyadh (SA)

(*) Notice: Subject to any disclaimer, the term of this patent is extended or adjusted under 35 U.S.C. 154(b) by 308 days.

(21) Appl. No.: 13/052,748

(22) Filed: Mar. 21, 2011

(65) Prior Publication Data

US 2011/0240794 A1 Oct. 6, 2011

Related U.S. Application Data (60) Provisional application No. 61/318,937, filed on Mar. 30, 2010.

(51) Int. Cl.
B64B 1/06 (2006.01)
B64C 1/14 (2006.01)
B64C 1/24 (2006.01)

(52) U.S. Cl.
USPC ........ 244/30; 244/129.5; 244/118.3; 244/125

(58) Field of Classification Search
USPC .................. 244/24–33, 115, 118.3, 129.5
See application file for complete search history.

(56) References Cited

U.S. PATENT DOCUMENTS

| | | | | |
|---|---|---|---|---|
| 1,306,082 A * | 6/1919 | Simanik | ................ | 244/30 |
| 1,343,428 A * | 6/1920 | Berry | ................ | 244/30 |
| 1,732,040 A * | 10/1929 | Edwards | ................ | 244/30 |
| 1,808,132 A * | 6/1931 | Duering | ................ | 244/30 |
| 2,910,255 A * | 10/1959 | Johnson | ................ | 244/129.6 |
| 2,933,149 A * | 4/1960 | Lee | ................ | 244/129.6 |
| 3,065,934 A * | 11/1962 | Jackson | ................ | 244/17.21 |
| 3,128,068 A * | 4/1964 | Pauli | ................ | 244/129.5 |
| 3,147,942 A * | 9/1964 | Griffith | ................ | 244/118.3 |
| 3,180,590 A * | 4/1965 | Fitzpatrick | ................ | 244/30 |
| 3,736,897 A * | 6/1973 | Krutz | ................ | 114/363 |
| 3,801,044 A * | 4/1974 | Moore | ................ | 244/5 |
| 3,856,238 A * | 12/1974 | Malvestuto, Jr. | ................ | 244/5 |
| 3,934,847 A * | 1/1976 | Bentivegna | ................ | 244/137.2 |
| 4,014,486 A * | 3/1977 | Nelson et al. | ................ | 244/129.6 |
| 4,113,207 A * | 9/1978 | Dalziel | ................ | 244/137.2 |
| 4,235,399 A * | 11/1980 | Shorey | ................ | 244/118.3 |
| 4,453,684 A * | 6/1984 | Hanks | ................ | 244/129.5 |
| 4,588,148 A * | 5/1986 | Krauchick | ................ | 244/137.2 |
| 5,026,003 A * | 6/1991 | Smith | ................ | 244/26 |
| 5,375,795 A * | 12/1994 | Strunk | ................ | 244/118.5 |
| 5,823,468 A * | 10/1998 | Bothe | ................ | 244/2 |
| 6,315,242 B1 * | 11/2001 | Eichstedt et al. | ................ | 244/30 |
| 6,467,724 B2 * | 10/2002 | Kuenkler | ................ | 244/17.25 |
| 6,843,448 B2 * | 1/2005 | Parmley | ................ | 244/30 |

(Continued)

OTHER PUBLICATIONS

Wikipedia Entry "Airstair," dated Feb. 22, 2009, describing the 737 trifold airstair system.*

Primary Examiner — Joseph W Sanderson
Assistant Examiner — Marc Burgess
(74) Attorney, Agent, or Firm — Andrew M. Calderon; Roberts Mlotkowski Safran & Cole, P.C.

(57) ABSTRACT

An airship for facilitating transportation to and from one or more locations which are difficult to access or operate such as high above the ground level is disclosed. The airship can also be used in surface missions. The airship includes a cabin and a platform. The cabin is configured on a top portion of the airship. The platform is operatively connected to the cabin. The platform facilitates easy access to the cabin.

23 Claims, 5 Drawing Sheets

(56) References Cited

U.S. PATENT DOCUMENTS

| | | |
|---|---|---|
| 6,860,449 B1 * | 3/2005 | Chen .......................... 244/12.1 |
| 6,880,783 B2 * | 4/2005 | Munk ............................. 244/25 |
| 7,001,132 B2 * | 2/2006 | Koretsky et al. .............. 414/537 |
| 7,040,572 B2 * | 5/2006 | Munk ...................... 244/100 R |
| 7,137,350 B2 * | 11/2006 | Waldock ....................... 114/362 |
| 7,350,746 B2 * | 4/2008 | Gili et al. ........................ 244/30 |
| 7,677,494 B2 * | 3/2010 | Yada et al. .................. 244/118.3 |
| 7,828,248 B2 * | 11/2010 | Gonzalez Linero ....... 244/137.2 |
| 8,177,159 B2 * | 5/2012 | Khakimov et al. ............... 244/5 |
| 8,215,581 B1 * | 7/2012 | Kulesha .................... 244/118.3 |
| 2005/0230526 A1 * | 10/2005 | Loustaudaudine et al. ..... 244/29 |
| 2008/0116315 A1 * | 5/2008 | Hamburg ........................ 244/30 |
| 2009/0194637 A1 * | 8/2009 | Ashton et al. .............. 244/129.5 |

* cited by examiner

AIRSHIP FOR TRANSPORTATION

CROSS REFERENCE TO RELATED APPLICATIONS

The present invention claims priority to U.S. provisional application Ser. No. 61/318,937, filed on Mar. 30, 2010, the contents of which are incorporated by reference in their entirety herein.

FIELD OF THE INVENTION

The invention generally relates to facilitating transportation at locations which are difficult to access or operate such as high above the ground level, and more specifically, to the airship for facilitating transportation and rescue operations at locations high above the ground level and at ground level while the airship is hovering, for example.

BACKGROUND OF THE INVENTION

Transportation and performing rescue operations at locations high above the ground level remains tedious and potentially dangerous. Especially, when a location where the transportation and the rescue operations need to be performed is difficult to access the task becomes even more challenging. For example, considering the rate of increase in high rise buildings, the risk involved with people living or working in those high rise buildings has also increased. The risk may be because of fire incidents, terrorist attacks, hostage situations, and civil defense, etc. Additionally, maintenance of these high rise buildings is also a time consuming and risky job.

In existing technologies, helicopters are used to rescue people trapped inside a multi-story building in case of fire break out or any hazardous incidents. Helicopters may use one or more of ropes, cables, cages, ladders, and baskets to rescue the people trapped inside the multi-story building. However, the use of ropes, cables, and ladders involves considerable amount of risk due to the dynamics of the helicopters. Additionally, the dynamics of the helicopters results in movement of hanging cages and hanging baskets. The movement of the hanging cages and the hanging baskets may create height and space limitations.

Further, elevators may also be used to overcome the above limitations. The elevators can be installed on a wall of the multi-story building. Alternatively, the elevators may be installed in the ground and may be used to access different stories of the building. However, the elevators have various limitations. For example, the elevators installed on the ground cannot be used to access stories of the building that are very high above the ground level due to height limitations of the elevators. Additionally, the elevators have limited capacity for rescuing people from the building. Similarly, individual rescue techniques are also available. However, the individual rescue techniques have limitations in case of mass evacuation of a building.

Therefore, there is a need for an airship for performing transportation and rescue operations at locations high above the ground level in a convenient manner or at ground level, as well. Accordingly, there exists a need in the art to overcome these and other deficiencies and limitations described hereinabove.

SUMMARY OF THE INVENTION

In a first aspect of the invention, an airship comprises at least one balloon unit including one or more balloon chambers. The airship further comprises one or more propellers configured to propel the balloon unit, powered by one or more motors. The airship further comprises a cabin configured on a portion of the airship. The airship further comprises a platform operatively connected to the cabin which is structured to extend from the airship during flight and which facilitates ingress and egress to the cabin.

In another aspect of the invention, an airship comprises a first balloon unit including one or more balloon chambers. The airship further comprises a second balloon unit including one or more balloon chambers. The airship further comprises a structural frame connecting the first balloon unit to the second balloon unit. The airship further comprises a cabin, operatively connected to the structural frame and positioned between the first balloon unit and the second balloon unit, at a same level thereof. The airship further comprises at least one door hinge mounted to the structural frame or the cabin. The airship further comprises an extendable platform that extends from the cabin to provide ingress and egress from the cabin, wherein the extendable platform is structured to provide access to outside of the cabin during flight. The airship further comprises one or more propellers configured to propel the airship mounted to the first and second balloon unit, or the cabin.

BRIEF DESCRIPTION OF THE DRAWINGS

The present invention is described in the detailed description which follows, in reference to the noted plurality of drawings by way of non-limiting examples of exemplary embodiments of the present invention. The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

The invention generally relates to facilitating transportation at locations which are difficult to access or operate such as high above ground level, and more specifically, to an airship for facilitating transportation and rescue operations at locations high above ground level and at ground level while the airship is hovering, for example. It should be understood that the embodiments reside primarily in combinations of method steps and apparatus components related to the airship for transportation. Accordingly, the apparatus components, method steps and system components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

Figure 1:
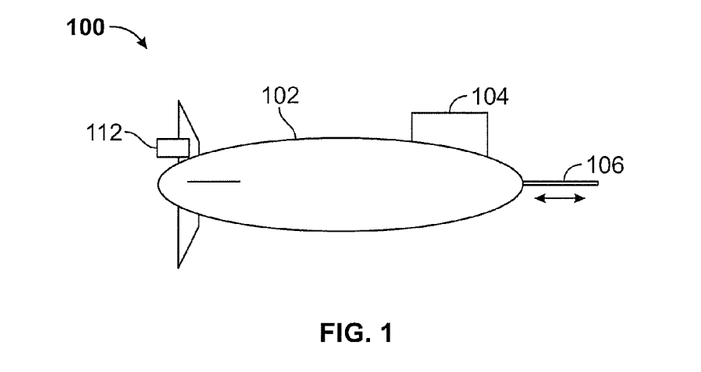
FIG. 1 illustrates an airship in accordance with an embodiment of the invention.

Referring to figures and in particular to FIG. 1, an airship 100 is illustrated, in accordance with an embodiment of the invention. The airship 100 facilitates transportation and rescue operations at one or more locations high above ground level. The one or more locations may include, but are not limited to, multi-story buildings, mountains, cliffs, bridges, cable carts, and high-rise structures. For example, the airship 100 may be used for transporting people from a top story of a multi-story building to the ground during rescue operations performed on the multi-story building.

The airship 100 includes a balloon unit 102. It will be apparent to a person skilled in the art that the airship 100 is shown to include one balloon unit 102 only for purpose of description; however, the airship 100 may include more than one balloon unit similar to balloon unit 102, as discussed in more detail below. The airship 100 may be driven by one or more propellers (power plants) 112 configured on the balloon unit 102. A propeller 112 of the one or more propellers may be powered by one or more motors. The one or more motors may include, but not limited to, electric motor, mechanical motor, hydraulic motor, and combustion engine.

The balloon unit 102 of the airship 100 includes one or more balloon chambers. The one or more balloon chambers may facilitate in lifting the airship 100 in the air. The one or more balloon chambers may include one or more gases lighter than air. Thus, these one or more gases facilitate in lifting the airship 100 in the air. In order to lift the airship 100, the one or more balloon chambers filled with the one or more gases develop buoyancy force on the airship 100. A gas of the one or more gases may be one of hydrogen gas, helium gas, ammonia gas, and methane gas. For example, the one or more balloon chambers of the airship 100 filled with hydrogen and/or helium gas creates buoyancy force on the airship 100 thereby resulting in lifting of the airship 100. In an embodiment, the one or more balloon chambers may be vacuumed to facilitate the airship 100 to rise in the air.

Further, the airship 100 includes a cabin 104. In embodiments, the cabin 104 is configured on a top portion of the airship 100; although as discussed in more detail below, other configurations are also contemplated by the present invention. For example, it will be apparent to a person skilled in the art that the cabin 104 may be configured on any part of the airship 100 such as to provide easy access to the cabin 104 from locations near by the airship 100. The cabin 104 may be capable of accommodating one or more of, but not limited to, people and goods. It will be apparent to a person skilled in the art that the airship 100 is shown to include one cabin for purpose of description, however the airship 100 may include more than one cabin similar to cabin 104. In an embodiment, the cabin 104 may be configured at one side of the airship 100. For example, a cabin may be configured at a side portion of the airship.

Further, the airship 100 includes a platform 106. The platform 106 is operatively connected to the cabin 104 and can be extended during the flight of the airship 100. The platform 106 is connected to the cabin 104 to facilitate ingress and egress to the cabin 104. In an embodiment, the platform 106 is operatively connected to the cabin 104 such that the platform 106 may be rotated at an angle varying from 0° to 360° with respect to the cabin 104. This rotating feature of the platform 106 may facilitate the airship 100 to access locations high above the ground level from different angles. For example, the platform 106 may be rotated to access various locations from different angles with respect to the airship 100 without moving the airship 100. This rotation of the platform 106 may be accomplished by any known mechanism such as known mechanical or electrical swivel mechanisms. In embodiments, the platform 106 may form part of a lower portion of a clam shell door configuration (which is discussed in more detail below). The use of platform as a lower door of the clam shell door configuration will reduce overall weight of the airship. That is, it would not be necessary to have a separate platform and door.

In another embodiment, the platform 106 may be extendable as represented by the double arrow in FIG. 1. It will be apparent to a person skilled in the art that the platform 106 may be extended up to different lengths using any mechanisms known in the art. The extendibility feature of the platform 106 may facilitate the airship 100 to access locations that are high above the ground level from a substantial distance. For example, the platform 106 may be extended to access places located at different distances from the airship 100 without moving the airship 100. In embodiments, the platform 106 preferably extends past an outer surface of the airship, to provide ingress and egress during flight, e.g., to effectuate rescue operations.

Additionally, the extendibility feature of platform 106 may also be used to transport the one or more people and goods to the cabin 104 from a location and to the location from the cabin 104. In this case, the platform 106 may have a configuration similar to a basket connected to an end of an extendable member (shown, for example, in FIG. 4). The other end of the extendable member may be operatively connected to the cabin 104. Thus, people standing on the platform 106 may be transported outside the cabin 104 by moving the platform 106 away from the cabin 104 using the extendable member. Similarly, the platform 106 may be capable of transferring people from a location to the cabin 104 using the extendable member.

For example, the airship 100 may be used to rescue people trapped at different locations on a cliff. In this case, the airship 100 may be maneuvered to the cliff and kept in a position such that maximum locations on the cliff where people are trapped are easily accessible to the airship 100. Further, the platform 106 may be rotated with respect to the airship 100 to access these different locations on the cliff at different angles. Thus, the people trapped in these different locations can be transferred to the cabin 104 of the airship 100 using the platform 106 thereby rescuing the people. Additionally, the platform 106 may be extended to access locations on the cliff that are located far from the airship 100. In this manner, people at these locations on the cliff are transferred to the cabin 104 using the platform 106. Thereafter, the airship 100 may transfer those people to a safe place.

Figure 2:
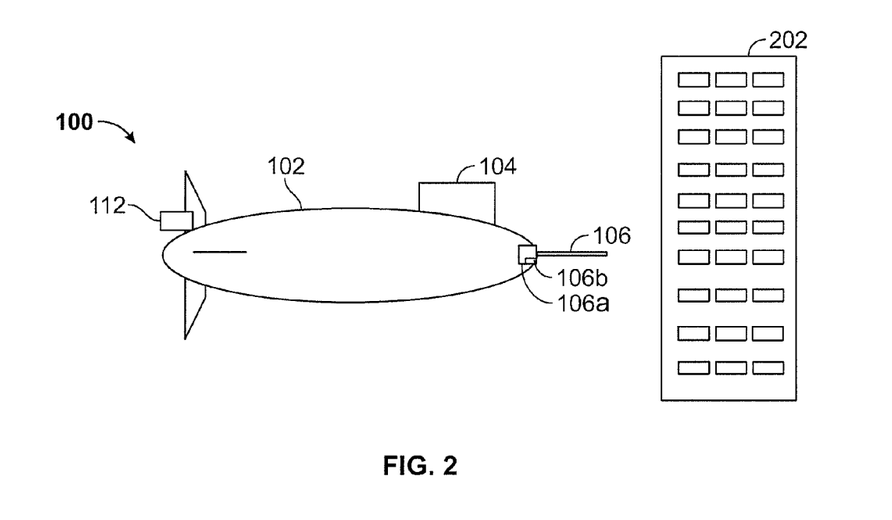
FIG. 2 illustrates an airship used for performing transportation and rescue operations on a building in accordance with an exemplary embodiment of the invention.

Referring now to FIG. 2, the airship 100 used for performing transportation and rescue operations on a building 202 is illustrated in accordance with an exemplary embodiment of the invention. The airship 100 facilitates transportation of people or goods to or from one or more stories of a multi-story building 202. The one or more stories may be located high above the ground level.

The airship 100 includes one or more balloon units 102. The airship 100 may be driven by one or more propellers configured on the balloon unit 102. A propeller of the one or more propellers 112 may be powered by one or more motors, as discussed herein. The balloon unit 102 includes one or more balloon chambers, which facilitate in lifting the airship 100 in the air. The one or more balloon chambers may include one or more gases. The one or more gases may be lighter than air to lift the airship 100 in the air. In order to lift the airship 100 the one or more balloon chambers filled with the one or more gases develop buoyancy force on the airship 100. In an embodiment, the one or more balloon chambers may be vacuumed to facilitate the airship 100 to rise in the air.

Further, the airship 100 includes the cabin 104. The cabin 104 is configured on a top portion of the airship 100. The cabin 104 may be positioned such as to provide easy access to the cabin 104 from different stories of building 202 when the airship 100 is located near to the building 202. The cabin 104 may be capable of accommodating one or more of, but not limited to, people and goods. In an embodiment, the cabin 104 may be configured at one side of the airship 100. In a scenario, the cabin 104 is configured on a top portion of the airship 100 to have easy access from different stories of building 202 as illustrated in FIG. 2; although other locations are also contemplated by the present invention.

Further, the airship 100 includes the platform 106, which is operatively connected to the cabin 104. As discussed with respect to FIG. 1, the platform 106 may be part of a lower door of a clamshell door configuration. The platform 106 is connected to the cabin 104 to facilitate easy access to the cabin 104 from outside, even during flight of the airship 100. In an embodiment, the platform 106 may be rotated at an angle varying from 0° to 360° with respect to cabin 104, by use of a mechanical or electric swivel unit 106a. This rotating feature of the platform 106 may enable the airship 100 to have access to different stories of the multi-story building 202. For example, the airship 100 may be positioned near building 202 during a fire break out in building 202. The platform 106 of the airship 100 may be maneuvered at different angles and may extend from the airship at different lengths (as explained in greater detail below) to gain access to different stories of building 202. Thus, people trapped in these stories can be easily transferred to cabin 106 using platform 106. Thereafter, the airship 202 may land on the ground and the people present in the cabin 104 may move out to the ground safely through the platform 106. The platform 106 may be extended using, for example, any electric motor, or other mechanical or pneumatic system such as, for example, rack and pinion gear or hydraulic system all of which are represented by reference numeral 106b.

Figure 3:
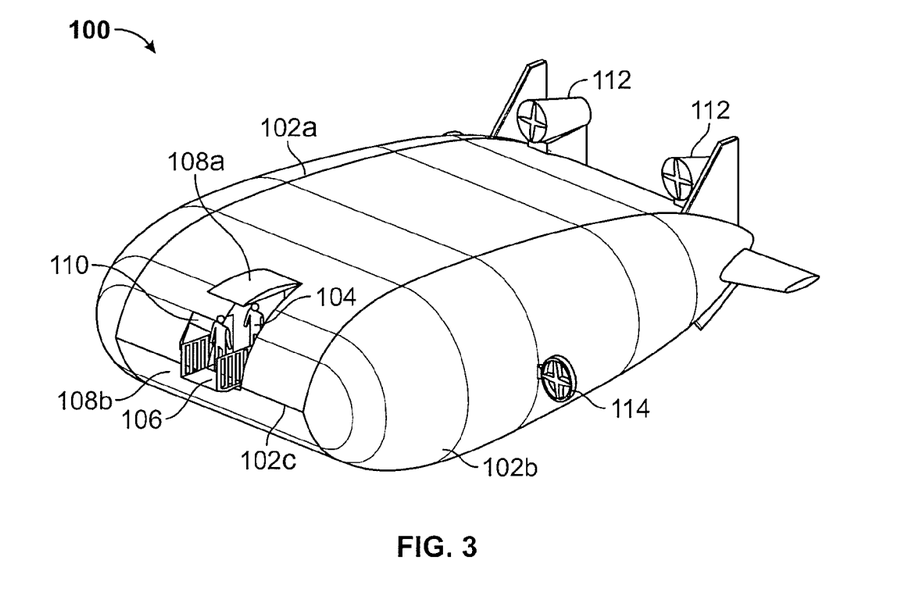
FIG. 3 illustrates another configuration of the airship in accordance with an exemplary embodiment of the invention.

FIG. 3 illustrates another configuration of the airship 100 in accordance with an embodiment of the invention. In embodiments, the airship 100 is shown to include a first balloon unit 102a and a second balloon unit 102b, connected together by a structural frame 102c. The structural frame 102c can be made from any aviation grade structural material such as, for example, aluminum or other materials used for structural material in the aviation field. The first balloon unit 102a and the second balloon unit 102b may include chambers filled with gases for providing buoyancy, as described herein.

The structural frame 102c encompasses the cabin 104. In embodiments, the cabin 104 is accessible through one or more doors 108a, 108b. The cabin 104 can also include a cockpit 110. In embodiments, the door 108a can be an upper door and the door 108b can be a lower door, both of which are hinge mounted to portions of the structural frame 102c or cabin 104. In embodiments, the doors 108a, 108b are clamshell type doors, which dropped down and lift upwards to open. In embodiments, the lower door 108b may be used as the platform 106; although, it is contemplated that the platform 106 can also be a separate unit. In embodiments, the platform 106 need not be extendable; although such extensions are still contemplated by the present invention. In a specific embodiment, the lower door 108b acts as the platform 106 and may be about one third of the opening (deployed); whereas, the upper door 108a may be two thirds of the opening. For example, in embodiments, the lower door 108b (platform 106) may be about 60-70 cm of the total ingress/egress opening.

In embodiments, the bottom door 108b can act as the platform 106, which can be extended outwards at different angles, depending on the opening angle of the door 108b, itself. Also, the door 108b can be extended by use of additional platforms, for example. More specifically, the platform 106 can be a trifold type system, which unfolds upon opening of the door 108b. The cabin 104 is preferably completely enclosed for the safety of the passengers and crew, with the doors 108a, 108b providing access to the cabin 104 and the cockpit 110. The opening, extending and rotating of the platform 106 can be performed by any of the mechanisms already described herein.

In embodiments, the cabin 104 can be provided between the two airships, e.g., first balloon unit 102a and second balloon unit 102b, and preferably with a passenger cabin in the front and upper half of the airship 100. The remaining portion of the cabin 104 (including below a floor of the cabin) can be used for mechanical and electrical systems, as well as storage, etc. Accordingly, the placement and configuration of the cabin 104 between the first balloon unit 102a and second balloon unit 102b provides for added payload and passenger capacity. Also, the overall airframe design contributes to the overall lift generation of the airship 100.

Moreover, by placing the cabin 104 between the first balloon unit 102a and second balloon unit 102b, it is possible to achieve different configurations of the airship 100, e.g., wider or narrower spacing between the chambers for optimal sizing. This configuration also allows the airship 100 to be easily configured by merely changing the width of the cabin 104. Additionally, the shape of the cabin 104, in combination with the first and second balloon units 102a, 102b, also contributes to the overall aerodynamic shape of the airship 100.

Still referring to FIG. 3, the airship 100 can be covered with a hard skin, known to those of ordinary skill. For example, the skin can be aluminum, carbon fiber, polyvinyl chloride, polyethylene, polypropylene, and combinations thereof to name a few illustrative examples. The airship 100 also includes a power plant system which comprises a main power plant 112 and side or auxiliary power plants 114. In embodiments, the power plant system can comprise four units, e.g., two main power plants 112 are located at the back for thrust function and two auxiliary power plants 114 are located at the sides for steering and support functions. The power plants 112, 114 can comprise internal combustion engines, electrical motors or any combinations thereof.

Figure 4:
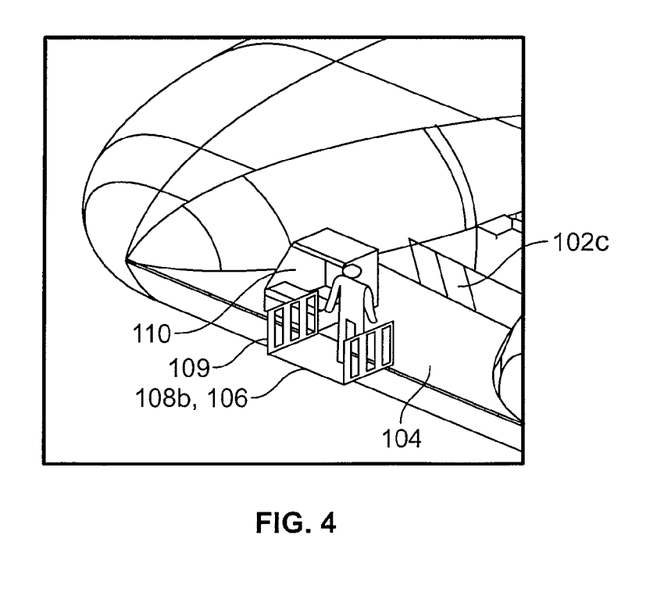
FIG. 4 shows an enlarged view of a passenger cabin of FIG. 3 in accordance with an exemplary embodiment of the invention.

FIG. 4 shows an enlarged view of a passenger cabin of FIG. 3 in accordance with an embodiment of the invention. As shown more clearly in FIG. 3, the skeletal frame 102c links together the two balloon units 102a, 102b. Then the cabin 104 and other components are assembled on this frame 102c. The gap between the two airships (102a, 102b) is covered by upper and bottom hoods (hard skin) to obtain the final shape. As further shown, the platform 106 can be a basket-like platform. For example, the platform 106 can resemble a stair wall/hitch/guide system, represented at reference numeral 109. The hitch 109 is attached to the lower (step) door 108b and is foldable, much like systems on conventional aircraft. For example, the hitch 109 is extended as the door 108b is opened, and folded as the door 108b is closed, as in conventional small aircraft configurations. The cockpit 110 can be at the same level as the cabin 104.

Figure 5:
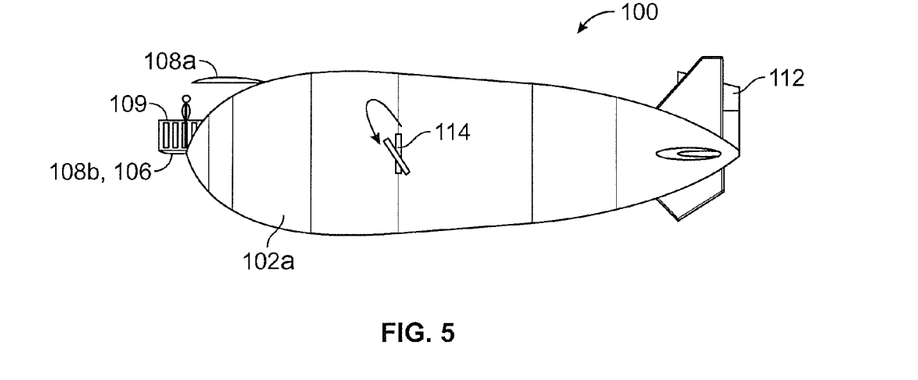
FIG. 5 shows a side view of the airship in accordance with an exemplary embodiment of the invention.

FIG. 5 shows a side view of the airship in accordance with an embodiment of the invention. As shown in this view, the balloon unit 102a includes a side or auxiliary power plant 114. At the rear of the airship 100 is the main power plant 112. The platform 106 is shown to be extending from the cabin, at a front end of the airship 100. However, it should be recognized by those of skill in the art that the platform 106 can equally extend from other locations from the cabin or airship 100. In the view shown, the platform 104 is fully extended, with the hitch 109 opened for the safety of the passengers.

FIG. 5 also shows various angles of the side or auxiliary power plants 114 for powering and/or maneuvering of the airship in accordance with an embodiment of the invention. As shown by the arrow in FIG. 5, the side or auxiliary power plants 114 can be rotated at different angles. Additionally, in this configuration, the side or auxiliary power plants 114 are mounted to the outside shell of the airship of the cabin 104, e.g., balloon units 102a and 102b (not shown).

Figure 6:
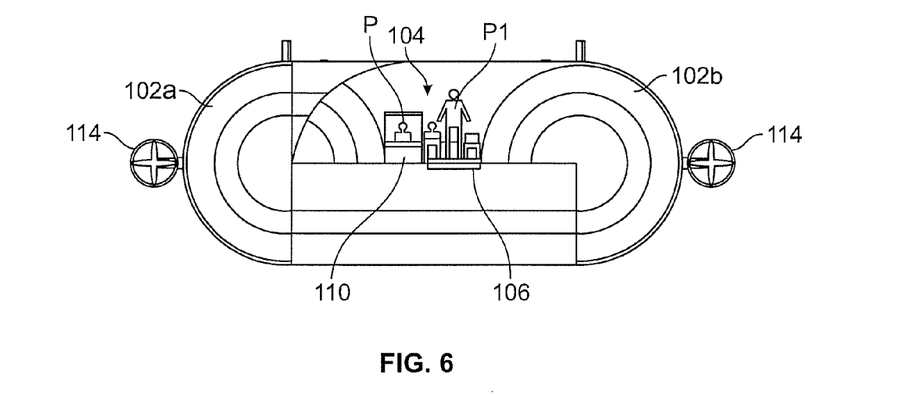
FIG. 6 shows a front view of the airship in accordance with an exemplary embodiment of the invention.

FIG. 6 shows a front view of the airship in accordance with an embodiment of the invention. As shown in this view, the side or auxiliary power plant 114 extends from each of the balloon units 102a and 102b. Also, the cabin 104 includes the cockpit 110 which can accommodate one or more pilots "P". The platform 106 extends from the cabin 104, with a passenger "P1" ready to disembark or perform a rescue operation.

Figure 7:
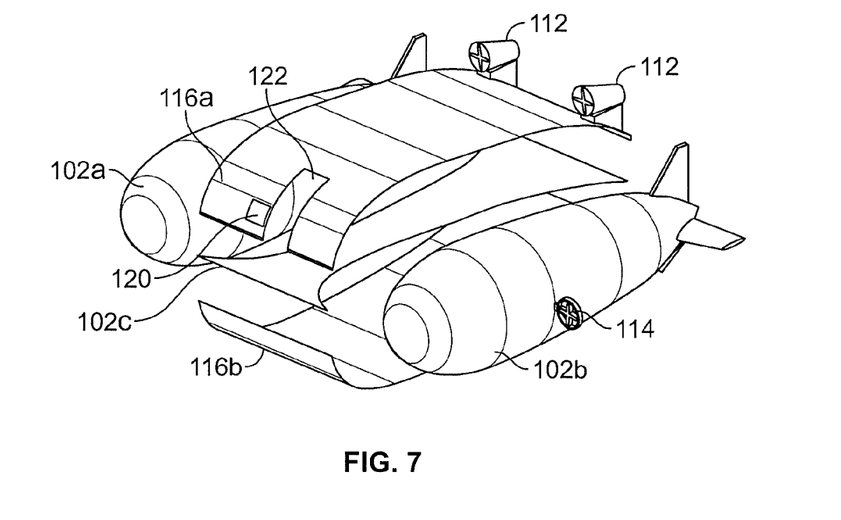
FIG. 7 shows an exploded view of the airship shown in FIGS. 5 and 6 in accordance with an exemplary embodiment of the invention.

FIG. 7 shows a fragmented (exploded) view of the airship shown in FIGS. 5 and 6 in accordance with an exemplary embodiment of the invention. More specifically, FIG. 7 shows the balloon unit 102a and balloon unit 102b, each including a side or auxiliary power plant 114 mounted to the outside shell. The structural frame 102c connects the balloon unit 102a and balloon unit 102b. The structural frame 102c may also be used as the flooring for the cabin. The structural frame 102c can be made from any aviation grade structural material such as, for example, aluminum or other materials used for structural material in the aviation field. The cabin and other components are assembled on this frame 102c, which is covered by an upper hood 116a and bottom hood 116b to obtain the final shape. The upper hood 116a includes an opening 118 for the pilot(s) and an opening 120 for the door(s) and/or platform. The main power plants 112 can be mounted to the upper hood 112a and/or structural frame 102c.

Figure 8:
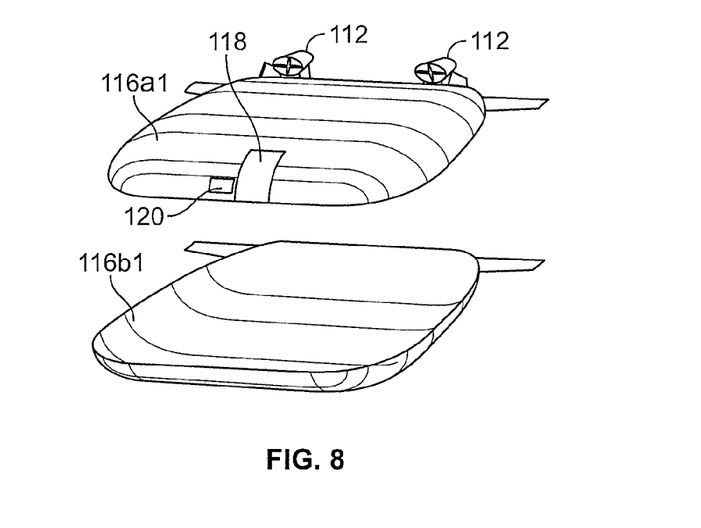
FIG. 8 shows an exploded view of another variation of the airship shown in FIGS. 5 and 6 in accordance with an exemplary embodiment of the invention.

FIG. 8 shows a fragmented (exploded) view of another variation of the airship in accordance with an exemplary embodiment of the invention. More specifically, FIG. 8 shows an upper hood 116a1 and bottom hood 116b1, which are used to obtain the final shape. In this configuration, the upper hood 116a1 and bottom hood 116b1 completely or substantially completely cover the components of the airship 100 including, for example, the balloon units, cabin, cockpit, etc. The interior components are assembled using suitable structural components, known to those of skill in the aviation field; that is, the structural components can be made from any aviation grade structural material such as, for example, aluminum or other materials used for structural material in the aviation field. The upper hood 116a1 includes an opening 118 for the pilot(s) and an opening 120 for the door(s) and/or platform.

Figure 9:
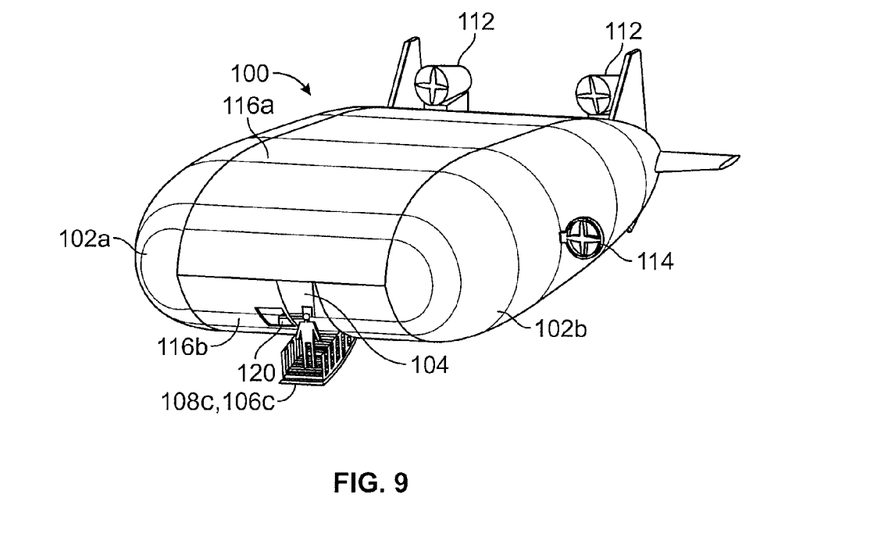
FIG. 9 shows an alternative airship design in accordance with aspects of the present invention.

FIG. 9 shows an alternative airship design in accordance with aspects of the present invention. As shown in the airship design of FIG. 9, the ingress and egress to the cabin 104 is provided at a bottom portion of the airship 100. In embodiments, the cabin 104 can be at the bottom, front of the airship 100 and can be configurable to be at two or more levels of the airship. In this configuration, the door 108 and platform 106 are provided in the bottom hood 116b, which can extend to the ground when deployed. That is, in this configuration, a single door 108c extends downward when deployed, and is used for the platform 106c. This configuration serves for surface (ground) rescue (as well as transporting) missions such as floods, earthquakes, etc. where it is difficult to land or reach ground or to use helicopters which blow air towards the ground which increases the risks of rescue operations. This configuration thus provides superior access to evacuees and provides superior pilot vision for better rescue operation, through the opening 120. As in other embodiments, the main power plants 112 can be mounted to the upper hood 112a, and the side or auxiliary power plant 114 are mounted to the balloon units 102a and 102b (and/or the upper or lower hoods).

Figure 10:
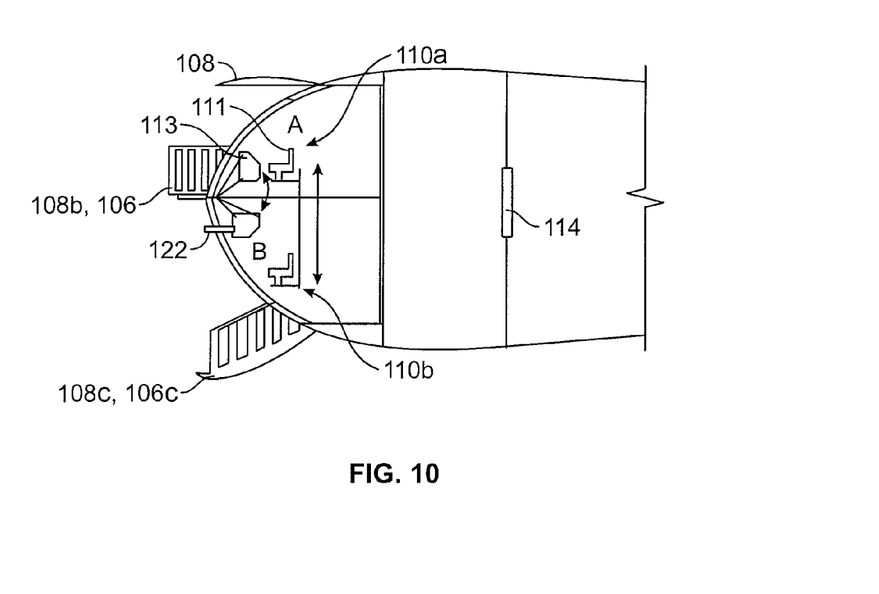
FIG. 10 shows an alternative airship design in accordance with aspects of the present invention.

FIG. 10 shows an alternative airship design in accordance with aspects of the present invention. As shown in the airship design of FIG. 10, the ingress and egress to the cabin 104 is provided at both a bottom, front portion and top, front portion of the airship 100. In embodiments, the cabin 104 can thus be at two or more levels of the airship. In this configuration, the door 108c and platform 106c are provided in the bottom hood 116b, which can extend to the ground when deployed. That is, in this configuration, a single door 108c extends downward when deployed, and is used for the platform 106c. This configuration serves for surface (ground) rescue (as well as transporting) missions such as floods, earthquakes, etc. where it is difficult to land or reach ground. The top, front portion of the airship 100 also includes the clamshell type doors 108a, 108b, which drop down and lift upwards to open. In embodiments, the lower door 108b may be used as the platform 106. In embodiments, the platform 106 need not be extendable; although such extensions are still contemplated by the present invention. In a specific embodiment, the lower door 108b acts as the platform 106 and may be about one third of the opening; whereas, the upper door 108a may be two thirds of the opening.

The embodiment of FIG. 10 also includes a reconfigured cockpit, having an upper cockpit 110a and a lower cockpit 110b. As can be seen in this figure, the pilot seat 111 is movable upward (position "A") and downward (position "B") and the dash-board/control panel 113 is rotatable/swivel between the two positions "A" and "B". This will save considerable weight in that there is no need for redundant components. In the upper cockpit 110a, the pilot may obtain assistance from external video cameras 122.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides the airship. The airship facilitates transportation from a location which is difficult to access or operate such as high above the ground level or at a location which is difficult to land such as, for example, earthquake locations, flooded areas or sea surfaces. The airship includes a cabin and a platform. The cabin is configured on a top portion of the airship. The platform is operatively connected to the cabin. The platform facilitates access to the cabin.

Various embodiments of the invention provide the airship for facilitating transportation from and to one or more locations high above the ground level or for surface missions as discussed herein. As a result, the airship is used to evacuate high rise buildings in case of fire break out or any other hazardous incidents. The airship may also be used to deploy special task forces to the one or more locations in case of situations like civil defense, terrorist attacks, hostage situation, etc. Further, the airship may also be used in construction and maintenance activities. In this case, the airship facilitates transportation of workers and tools for the construction and maintenance activities from one location to another. The airship may also be used for wild life observations. Additionally, the airship has a platform which can be extended and rotated in any direction. As a result, the airship is capable of accessing different places at different angles or distances with respect to the airship without moving the airship. Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed:

1. An airship comprising:
   at least one balloon unit including one or more balloon chambers;
   one or more propellers configured to propel the balloon unit, powered by one or more motors;
   a cabin configured on a portion of the airship; and
   a platform operatively connected to the cabin which is structured to extend from the airship during flight and which facilitates ingress and egress to the cabin during flight of the airship, wherein:
   the platform is rotatable at an angle with respect to the cabin by a swivel mechanism structured to rotate the platform; and
   the platform is extendable to different lengths in a horizontal plane from one end of the cabin, with respect to a floor of the cabin and further comprising:
   a cockpit, having an upper cockpit and a lower cockpit, wherein a pilot seat is movable upward and downward between the upper cockpit and the lower cockpit, and a dash-board/control panel is rotatable/swivelable between the two positions.

2. The airship of claim 1, wherein the platform is a trifold platform.

3. The airship of claim 1, wherein the platform forms a door leading to the cabin.

4. The airship of claim 1, wherein the at least one balloon unit is two balloon units, and the cabin is provided between the two balloon units.

5. The airship of claim 4, wherein the cabin is on one or more levels, and the platform is two platforms, wherein a first platform leads to an upper level cabin and a second platform leads to a lower level cabin.

6. The airship of claim 4, wherein the cabin is provided at a same level of the two balloon units.

7. The airship of claim 4, wherein the two balloon units are connected together by a structural frame which encompasses the cabin.

8. The airship of claim 7, wherein the cabin includes one or more doors, wherein a lower door is hinge mounted to portions of the structural frame or the cabin, and when opened acts as the platform, which is extendable.

9. The airship of claim 7, wherein the platform comprises a trifold system, which unfolds upon opening of the lower door.

10. The airship of claim 4, wherein the cabin includes a passenger cabin in a front and upper half of the airship between the two air balloon units.

11. The airship of claim 10, wherein remaining portions of the cabin are structured and configured for mechanical and electrical systems and storage.

12. The airship of claim 4, wherein the one or more propellers include at least one main power plant configured for front and back thrust functions, and side or auxiliary power plants configured for steering and support functions, wherein one of:
   the one or more propellers are attached to the cabin; and
   the one or more propellers are attached to the two air balloon units.

13. The airship of claim 1, wherein the at least one balloon are two balloons and the cabin is enclosed within a top hood and a bottom hood connecting between the two balloons, the cockpit and an opening in which the platform extends therefrom is located within the top hood.

14. The airship of claim 13, wherein the one or more propellers are provided on a top of the top hood.

15. The airship of claim 1, wherein the at least one balloon are two balloons and the cabin is enclosed within a top hood and a bottom hood connecting between the two balloons, and the cockpit and an opening in which the platform extends therefrom is located within the bottom hood.

16. The airship of claim 1, wherein:
   the platform is a basket-like platform.

17. An airship comprising:
   a first balloon unit including one or more balloon chambers;
   a second balloon unit including one or more balloon chambers;
   a structural frame connecting the first balloon unit to the second balloon unit;
   a cabin, operatively connected to the structural frame and positioned between the first balloon unit and the second balloon unit, at a same level thereof;
   at least one door hinge mounted to the structural frame or the cabin;

an extendable platform that extends from the cabin to provide ingress and egress from the cabin, wherein the extendable platform is extendable to different lengths in a horizontal plane from one end of the cabin, with respect to a floor of the cabin and is structured to provide access to outside of the cabin during flight; and one or more propellers configured to propel the airship mounted to the first and second balloon unit, or the cabin and a cockpit, having an upper cockpit and a lower cockpit, wherein a pilot seat is movable upward and downward between the upper cockpit and the lower cockpit, and a dash-board/control panel is rotatable/swivelable between the two positions.

18. The airship of claim 17, wherein the platform is at least one door.

19. The airship of claim 17, wherein the at least one door is a clamshell door system, wherein a lower door of the clamshell door system acts as the extendable platform.

20. The airship of claim 17, wherein the extendable platform comprises a trifold system, which unfolds upon opening of the door.

21. The airship of claim 17, wherein the cabin includes a passenger cabin in a front, upper half of the airship and a front, bottom half of the airship between the two air balloon units, and the at least one door includes a first door that provides access to the front, upper half of the airship and a second door that provides access to the front, bottom half of the airship.

22. The airship of claim 17, wherein the extendable platform is rotatable at an angle with respect to the cabin by a swivel mechanism structured to rotate the extendable platform.

23. An airship comprising:

at least one balloon unit including one or more balloon chambers;

one or more propellers configured to propel the balloon unit, powered by one or more motors;

a cabin configured on a portion of the airship;

a platform operatively connected to the cabin which is structured to extend from the airship during flight and which facilitates ingress and egress to the cabin during flight of the airship; and a cockpit, having an upper cockpit and a lower cockpit, wherein a pilot seat is movable upward and downward between the upper cockpit and the lower cockpit, and a dash-board/control panel is rotatable/swivelable between the two positions.

* * * * *